United States Patent [19]
Johnson et al.

[11] Patent Number: 5,717,499
[45] Date of Patent: Feb. 10, 1998

[54] CONTINUED PRINTING BY RESOLUTION REDUCTION

[75] Inventors: Allen Patrick Johnson; David William Murphy, both of Lexington, Ky.

[73] Assignee: Lexmark International, Inc., Lexington, Ky.

[21] Appl. No.: 519,495

[22] Filed: Aug. 25, 1995

[51] Int. Cl.$^6$ ........................................ H04N 1/40
[52] U.S. Cl. ........................................ 358/444
[58] Field of Search ........................ 358/401, 426, 358/428, 443, 444, 448, 449, 451; 382/256, 258, 259, 244; 395/102, 101, 139, 128, 115–117

[56] References Cited

U.S. PATENT DOCUMENTS

| | | |
|---|---|---|
| 4,394,693 | 7/1983 | Shirley ........................ 358/298 |
| 4,467,363 | 8/1984 | Tench ........................ 358/261 |
| 4,555,191 | 11/1985 | Gojo ........................ 400/121 |
| 5,083,214 | 1/1992 | Knowles ........................ 358/448 |
| 5,471,563 | 11/1995 | Dennis et al. ........................ 395/114 |
| 5,483,625 | 1/1996 | Robertson et al. ........................ 395/117 |
| 5,502,794 | 3/1996 | Sakurai ........................ 395/109 |

*Primary Examiner*—Thomas D. Lee
*Assistant Examiner*—Jerome Grant, II
*Attorney, Agent, or Firm*—John A. Brady

[57] ABSTRACT

Printer (1) has the capability of printing in either 600 by 600 dpi resolution or 300 by 300 dpi under control of data processor controller (17). Bit maps for printing are stored in memory (19). When complex pages require more memory than is available, information from groups of bits in the 600 by 600 bit map is used to define the significance of one bit in a 300 by 300 bit map and the page is printed in the 300 by 300 bit map. This avoids terminating printing or printing partial pages and the difference in images are minor.

7 Claims, 2 Drawing Sheets

CONTINUED PRINTING BY RESOLUTION REDUCTION

TECHNICAL FIELD

This invention relates to printing or other imaging in which the image is printed from a bit map in a high resolution such that complex images may overtax memory capacity. This invention provides continued printing where otherwise printing would be terminated.

BACKGROUND OF THE INVENTION

The resolution at which a printer prints determines the ability to render fine lines and to display small, intricate patterns. Printing at resolution of 300 by 300 pels per inch is common (pel is believed derive from the term "picture element" and is used as the term for the unit of print by dots or rectangles or similar units). Printing at 300 by 300 resolution is generally satisfactory, especially where the final printing of slanted lines and the like is smoothed by a technique which varies the actual printing slightly from that of the 300 by 300 bit map, such techniques being variously termed as anti-aliasing, stair step elimination or enhancement of resolution.

Printing from bit map data in resolution of 600 by 600 dots or pels per inch generally provides excellent printing, particularly when such smoothing techniques are also employed. Printing at even higher resolution, such as 1200 by 1200 further improves printing.

The bit map of data to be printed may be received as a bit map, but often it is created in the printer from a page description language. Typically, such printers have access to stored data defining characters in fonts, such as alphabetic characters and symbols. Thus, the page description language calls for, for example, an "a" and the printer controller, which is an electronic data processor, determines the bits in a bit map from stored font data and stores such information in memory. Graphic information is also determined and stored. The bit maps as they are built up are stored by compression techniques in which repetitive elements are represented by code rather than a bit in memory for each bit in the bit map. U.S. Pat. No. 4,467,363 to Tench is illustrative of such compression. Because of compression, typical pages are readily stored in memory, but complex pages, having less repetition, often exceed available memory, since much of their content can not be compressed and is therefore stored bit for bit in the bit map.

When available memory is exceeded by a page being composed in a bit map, the entire page is lost and an error is signaled by the printer or less than the entire page is printed. Printing less than the entire page is often not satisfactory to users as there is uncertainty as to the content of the lost data.

In accordance with this invention, the resolution of the bit map is reduced and printing is continued. This involves changing the bit map for images, which is done in the prior art to reduce or expand images, but not in the context of printing in a different resolution as is done in this invention. U.S. Pat. No. 4,394,693 to Shirley and U.S. Pat. No. 4,555,191 to Gojo are known which illustrate such prior art.

DISCLOSURE OF THE INVENTION

In accordance with this invention a printer operating by bit map data at a high resolution, such a 600 by 600 dpi (dots per inch), responds to an insufficiency of memory to store a page of data at such high resolution by approximating the high resolution data at a lower resolution such as 300 by 300 dpi. Memory is conserved since the approximated 300 by 300 data requires, at most, only one bit of memory where the 600 by 600 data required up to four bits of memory. The data is preserved in the same row and column relationship as the data from which it is derived, designated in memory as 300 by 300 data, and printed at that resolution. Only parts of the data may be revised to approximated, low resolution data, although generally a human observer prefers consistency in appearance within a page so an entire page is normally approximated when any of the approximation is done in the page.

The significance (black or white) of the same one of a contiguous group of, for example, four 600 by 600 bits, such as the upper right bit, may be used to define the significance of each bit in a 300 by 300 approximation corresponding to that rectangle. However, this results in a one bit horizontal lines being lost entirely if it is not in the selected bit of the rectangle and could result in distortion of certain dither patterns (dither patterns are the printing of small bits spaced apart to produce patterns which are seen by humans as gray areas). Where the foregoing is undesirable, a different bit in the rectangular group of four is selected by a line of rectangles in a predetermine pattern, such as upper right, then lower right, then upper right, then lower right, and so on, with the selections of the next line being upper left, then lower left, the upper left, then lower left, and so on. This pattern assures that a single bit from every line and every column is selected in a recurring pattern.

If the page is subsequently revised after being approximated, the revision will be for the high resolution data. The approximation data where needed for the revision is multiplied and replaced by four bits of the same significance in a rectangle corresponding in location to that of the original 600 by 600 rectangle from which the bit was devised. For revisions, the bits of the high resolution rectangle are the same significance as the approximation bit.

BRIEF DESCRIPTION OF THE DRAWING

The details of this invention will be described in connection with the accompanying drawing in which.

BEST MODE FOR CARRYING OUT THE INVENTION

In accordance with this invention the data for printing may be in a bit map which is binary (dark or white) data in 600 by 600 dpi resolution. Thus, the original data is generated on the assumption that each bit will dictate either black (or other color) or white (or contrasting color) for a square of 1/600 inch width and length, and these squares will be contiguous in rows and columns. Such bit maps are conventional, and may be received by an imaging device 1 (FIG. 1) from a data cable 3 (alternatively, from an infra-red port) or generated in the imaging device 1 from data in a page description language such as language for a PCL(R) interpreter (trademark of Hewlett-Packard Co.) or a PostScript(R) interpreter (trademark of Adobe Systems Incorporated).

Figure 1:
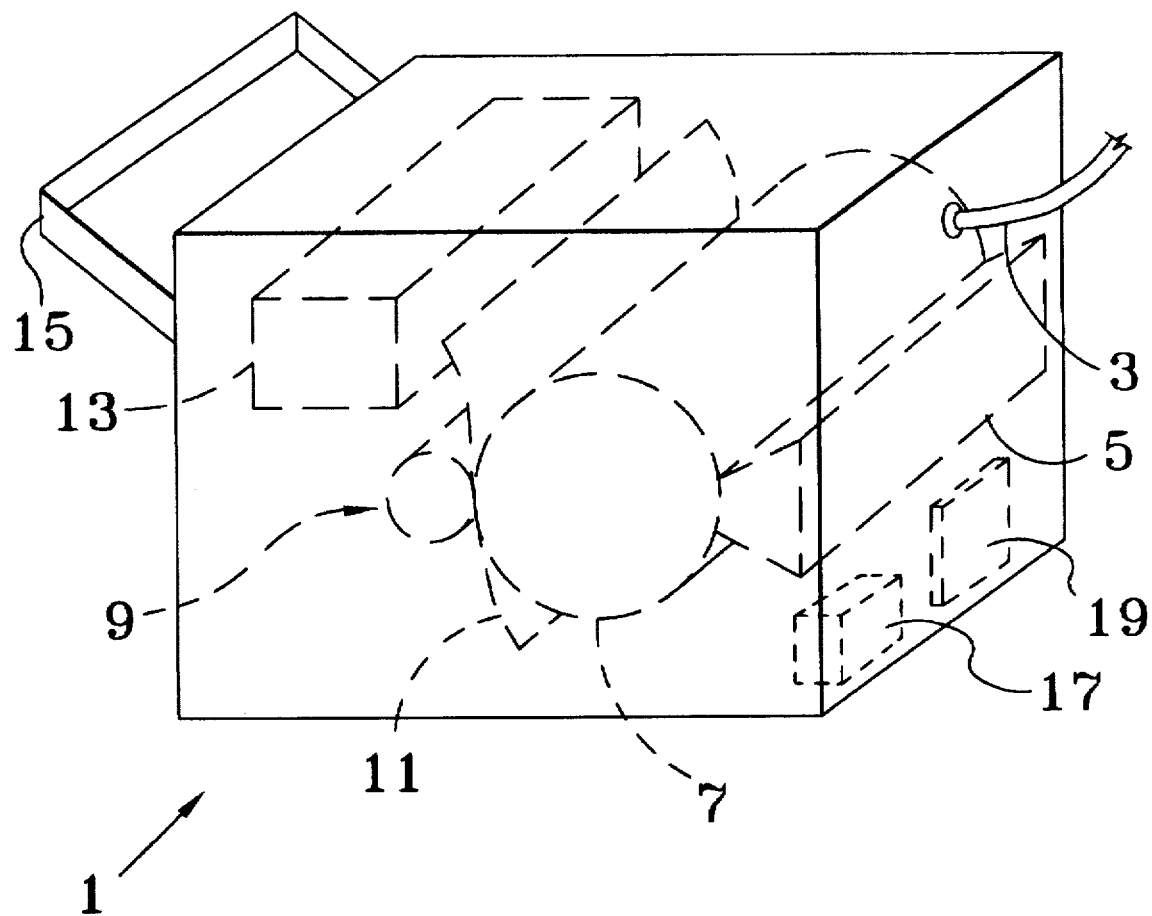
FIG. 1 is illustrative of a printer with this invention.

An illustrative printer is shown in FIG. 1. Page information may be received by printer 1 in a standard manner from a communication cable 3. Printer 1 may be any suitable printer which has a printhead system to print in the 600 by 600 resolution of the invention of this invention. (Such a printhead can print in 300 by 300 resolution by making two passes for each 300 resolution line.) Printer 1 is shown suggestive of an electrophotographic printer having a optical system 5 operative on photoconductive drum 7. Drum 7 transfers images defined by optical system 5 at transfer station 9 to paper 11. The image is fixed, typically by heat, at fixing station 13, and the finished printed page is delivered to output tray 15.

Data processor controller 17 is the controller of printer 1, which monitors the data received and may interpret the data with accordance to the control language in which the data processor 17 is operating. The bit maps created by controller 17, as well as information received on cable 3 and other information, is stored electronically in memory 19. Bit information from the bit map stored in memory 19 is applied to control optical system 5, although line smoothing techniques based on the final bit map may vary the actual printing in each bit position by optical system 5, for example by pulsing a laser in system 5 which the bit map designates as on for only part of the bit position.

Such enhancement of resolution techniques form no novel part of this invention since they occur after the final bit map is presented for printing, while this invention is to creating and printing the final bit map if necessary in a lower resolution. Accordingly, enhancement of resolution will not be described in detail. In the preferred embodiment system 5 has a laser which inherently has a vertical or paper-length-direction height correct for 600 dpi printing, but which can be pulsed in any combination of four evenly spaced locations in the horizontal or line direction, thereby providing an operating resolution of 600 by 2400 dpi. Enhancement of resolution does improve the visual appearance of printing of the approximated lower resolution data of this invention.

The fundamental memory conservation technique is to subsample a square group of pixels of size n by n in the bit map by choosing a single pel from the n by n square. Where the conversion is from 600 by 600 dpi to 300 by 300 dpi, n is 2. The physical region in the final image that was represented by the n by n square now takes on the value of the sampled pel. Thus, this achieves an n square compression. In addition, a lossless compression is applied to the thus approximated region, thus achieving an even higher effective reduction of memory requirement, with no further degradation of image quality.

Figure 2:
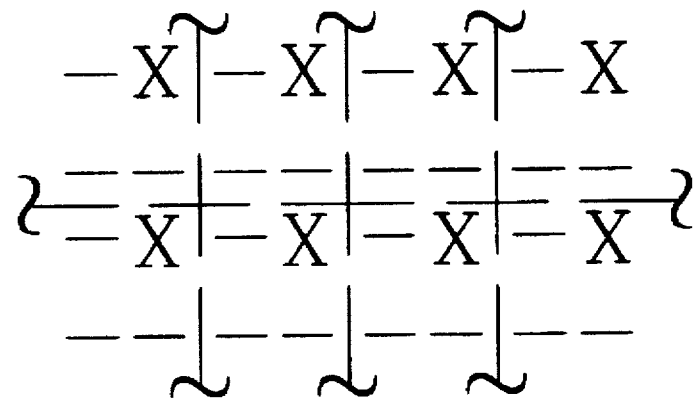
FIG. 2 illustrates a selection for the approximation in accordance with this invention, and FIG. 3 illustrated another selection for the approximation in accordance with this invention.

FIG. 2 shows a useful sampling technique for n being 2. The -'s and x's represent individual bits in a bit map, which may be represent one or zero significance of the image defined by the bit map. The longer dashed lines represent the imaginary boundaries of squares in the bit map which this invention employs for the approximation.

In conducting the approximation controller 17 enters the significance of only the x bits in a new bit map for low resolution printing. The significance of the bits shown as dashes is ignored. It is immediately apparent from FIG. 2 that the number of bits in the new bit map is reduced to one-fourth of the bits in the high resolution bit map. The bits in the new bit map are, of course, kept in the same row and column relationship as the corresponding bits from which they are derived.

Figure 3:
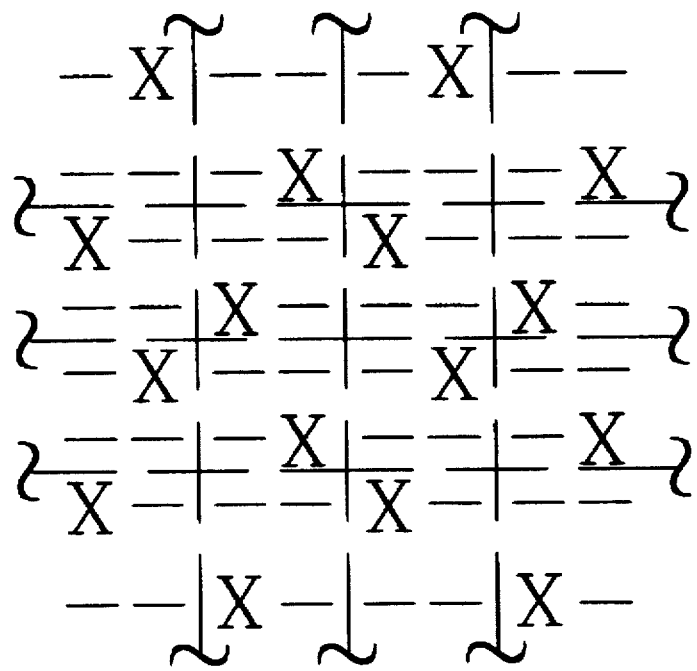

A generally more preferred approximation technique is illustrated in FIG. 3. The symbols in FIG. 3 have the same meaning as those in FIG. 2. The bits shown by "x", which are the bits which are copied into the new bit map, are alternated both horizontally and vertically from adjoining square of four to next adjoining square of four. This prevents the complete loss of any horizontal line of single pels and any vertical line of single pels. The pels in the new bit map are, of course, kept in the same relative position with respect to the rows and columns of the square in the high resolution bit map to which they correspond.

Standard data processing is employed to determine the significance of a bit in the higher resolution bit map. Each location in the bit map has a unique address and data processor 17 applies that address to the circuitry of memory 19. The output circuitry of memory 19 returns a signal of one or zero significance to data processor 17. Actual implemental may employ pointers to distribute data to available areas in the memory and other complexities, but such operation may be conventional and forms no part of this invention.

Other sampling techniques, or a mixture of sampling techniques, could be applied to different parts of an original bit mapped images based upon statistical or special knowledge or heuristic methods indicating which regions will look better when sampled by a given technique.

In a preferred system of control by controller 17, the page is segmented into designated areas, termed blocks, that may be compressed or decompressed independently of one another depending on the memory usage in the system. When all such blocks in a bit map for a page are compressed and the rest of the printer 1 has no more memory resources that can be freed, the algorithm in accordance with this invention is executed instead of notifying the user of a memory full error.

The sampling algorithm is then applied to as many blocks as desirable and then the formatting of the page will continue as this frees memory. Subsequently, it may be necessary for controller 17 to re-expand sampled block to allow more information to be placed in the image. This expansion is done simply by applying the significance of the approximation as the significance of all the pixels in the higher resolution, n by n square. Because a predetermined bit location was used for the compression and will be used again for subsequent compression, the compressed data will be consistent. Had an average of data in a group been used for compression, subsequent logical operations (such as Exclusive Or to overlay images) can give a result which varies the result from that from only a preselected bit.

In doing this the interpreter function of the controller 17 need not be adjusted because of the use of this invention, as that function works with bit maps in the original resolution. Such an adjustment would be costly since many of the control aspects of the printer 1 have been designed for the original higher resolution. In this sense the resolution reduction is transparent to the interpretation function.

The bit map reduced to 300 by 300 from 600 by 600 is printed preferably by the two adjoining line scans being for 600 by 600 resolution, but with the data being that from the same line of the bit map and the horizontal lengths for each pel being doubled, followed by the next two adjoining lines being by the next two adjoining lines scans in 600 by 600 resolution, but with the data being that from the same line of the bit map and the horizontal lines for each pel being doubled, and continuing in the same manner for all of the data. However, any ordinary printing of the reduced data as 300 by 300 dpi data is consistent with this invention. Moreover, the use of resolution enhancement techniques on the 300 by 300 data improves the visual output and is therefore normally used.

Although this invention involves the loss of data, it is believed much preferable to the alternative of known compression techniques which involve a loss of data. Such compression techniques often require extensive computation, for example the Discrete Cosine Transform. Further, since the data of this invention is readily reversed to the higher resolution, no "blocking" situation occurs with respect to merging the data with subsequent data, as is the case for some "neighborhood averaging" compression techniques. Also, the ready reversal of this invention allows the controller 17 to continue to place high resolution data with a section of the image that previously has been reduced.

As with any modification involving loss of data, the final images have a loss of detail. However, this invention employing resolution enhancement intended for ordinary 300 by 300 text produces 300 by 300 printed text from 600 by 600 data which is difficult to distinguish with the naked eye from printing by the 600 by 600 data with resolution enhancement.

It is clearly possible to approximate only a section of the page. This permits a choice of which sections of the page bit map should be at the truest fidelity to the original image.

Variations and adaptations of this invention will be apparent and can be anticipated. Patent coverage is sought as provided by law, with particular reference to the accompanying claims.

What is claimed is:

1. Printing apparatus which conserves memory comprising a memory to store an image in bit map form in a first resolution, said image being stored in said bit map in designated segments of said image, means to determine from the bit map of at least one of said segments a single significance from the significance of the bits of each of a group of contiguous bits in said bit map stored in a first resolution for each of a plurality of said groups and to store in memory a second bit map of bits of said determined significance from said groups configured in rows and columns in the same relative location as the rows and columns of the corresponding group from which the significance of each bit in said second bit map is defined, said single significance being determined from the significance of only one bit in a predetermined location in each said group, and means to print a final image from said second bit map in a lower resolution than said first resolution.

2. The printing apparatus as in claim 1 in which said one bit in a predetermined location in each group is varied from adjoining group to adjoining group in a predetermined pattern by which single bit horizontal or single bit vertical lines are included in some of said single bits from each group.

3. The printing apparatus as in claim 2 in which said first resolution is n by n dpi and said lower resolution is one-half n by one-half n dpi.

4. The printing apparatus as in claim 3 in which said single bit from each group is varied from adjoining group to adjoining group so that the single bit is from every other line of said n by n bit map and every other column of said n by n bit map.

5. Printing apparatus which conserves memory comprising a memory storing an image in bit map form in a first resolution, means to determine a single significance from the significance of only one bit in a predetermined location in each of a group of contiguous bits in said bit map stored in a first resolution for each of a plurality of groups and to store in said memory a second bit map of bits of said determined significance from said groups configured in rows and columns in the same relative location as the rows and columns of the corresponding group from which the significance of each bit in said second bit map is defined, said one bit in a predetermined location in each group being varied from adjoining group to adjoining group in a predetermined pattern by which single bit horizontal and single bit vertical lines are included in some of said single bits from each group, and means to print a final image from said second bit map in a lower resolution than said first resolution.

6. The printing apparatus as in claim 5 in which said first resolution is n by n dpi and said lower resolution is one-half n by one-half n dpi.

7. The printing apparatus as in claim 6 in which said bit from each group is varied from adjoining group to adjoining group so that the single bit is from every other line of said n by n bit map and every other column of said n by n bit map.

* * * * *